(12) United States Patent
Flippo et al.

(10) Patent No.: US 8,270,938 B2
(45) Date of Patent: Sep. 18, 2012

(54) MANAGING BATTERY POWER FOR MOBILE EMERGENCY COMMUNICATION DEVICE

(75) Inventors: Robert Flippo, Boca Raton, FL (US); Elias M. Janetis, Boca Raton, FL (US); Ernest F. Pasanen, Long Valley, NJ (US)

(73) Assignee: Integrity Tracking, LLC, Boca Raton, FL (US)

( * ) Notice: Subject to any disclaimer, the term of this patent is extended or adjusted under 35 U.S.C. 154(b) by 9 days.

(21) Appl. No.: 12/927,806

(22) Filed: Nov. 24, 2010

(65) Prior Publication Data

US 2011/0076984 A1 Mar. 31, 2011

Related U.S. Application Data

(63) Continuation-in-part of application No. 12/322,566, filed on Feb. 3, 2009, now Pat. No. 8,086,250.

(51) Int. Cl.
*H01Q 11/12* (2006.01)
*H04B 1/16* (2006.01)
*H04B 1/38* (2006.01)
*H04M 11/04* (2006.01)

(52) U.S. Cl. .............. 455/404.2; 455/127.5; 455/343.2; 455/343.4; 455/574

(58) Field of Classification Search .... 455/343.1–343.5, 455/404.1–404.2, 415, 427–430, 456.1–456.3, 455/456.5–456.6, 466, 550.1, 556.1–556.2, 455/560–561, 574, 3.05, 41.2, 127.5, 410–411, 455/418–420, 517, 520–521; 342/357.2, 342/357.22, 357.25, 357.28, 357.29, 357.43; 709/203, 218–219, 226, 228–229; 370/395.42–395.43, 395.5, 395.52, 913
See application file for complete search history.

(56) References Cited

U.S. PATENT DOCUMENTS

| | | | |
|---|---|---|---|
| 4,593,273 A | 6/1986 | Narcisse | |
| 4,598,275 A | 7/1986 | Ross et al. | |
| 4,814,751 A | 3/1989 | Hawkins et al. | |
| 4,884,060 A | 11/1989 | Shapiro | |
| 5,919,239 A | 7/1999 | Fraker et al. | |
| 6,121,922 A | 9/2000 | Mohan | |
| 6,198,390 B1 | 3/2001 | Schlager et al. | |
| 6,298,229 B1 * | 10/2001 | Tomlinson, et al. | 455/404.2 |
| 6,327,471 B1 * | 12/2001 | Song | 455/440 |
| 6,339,397 B1 | 1/2002 | Baker | |

(Continued)

*Primary Examiner* — Meless Zewdu
(74) *Attorney, Agent, or Firm* — Thomas R. Shaffer (57) ABSTRACT

A method of 2-way data and voice communication with a user utilizing a portable device having a cellular transceiver module, a GPS module and an emergency call button is disclosed. The method includes determining whether the portable device is in proximity of the base station; powering down the GPS, placing the portable device into sleep mode and sending a signal to the base station indicating that said portable device is in proximity of the base station when the portable device is in proximity to the base station; and activating and fully powering the cellular transceiver module and activating and fully powering said GPS module when the portable device is not in proximity of said base station. When not in proximity, the method also includes collecting an initial GPS location data from the GPS module and storing the location data into a memory location; placing the GPS module into a lower power mode and fully powering the GPS module, acquiring and storing additional GPS location data only at specified intervals to conserve battery life while monitoring the cellular transceiver module for inquiries and monitoring the emergency call button for an emergency signal. Various other steps occur when the emergency button is depressed which involve communicating with a back end server and collecting and sending various data packets.

3 Claims, 11 Drawing Sheets

U.S. PATENT DOCUMENTS

| | | |
|---|---|---|
| 6,400,272 B1 | 6/2002 | Holtzman |
| 6,441,778 B1 | 8/2002 | Durst et al. |
| 6,518,919 B1 | 2/2003 | Durst et al. |
| 6,544,171 B2 | 4/2003 | Beetz et al. |
| 6,590,525 B2 | 7/2003 | Yule et al. |
| 6,661,372 B1 | 12/2003 | Girerd et al. |
| 6,700,533 B1 | 3/2004 | Werb et al. |
| 6,859,171 B2 | 2/2005 | Durst et al. |
| 7,016,478 B2 * | 3/2006 | Potorny et al. .................. 379/49 |
| 7,038,590 B2 | 5/2006 | Hoffman |
| 7,123,141 B2 | 10/2006 | Contestabile |
| 7,138,916 B2 | 11/2006 | Schwartz et al. |
| 7,233,783 B2 | 6/2007 | Usui |
| 7,251,471 B2 | 7/2007 | Boling et al. |
| 7,349,705 B1 | 3/2008 | Holland |
| 7,545,318 B2 | 6/2009 | Derrick et al. |
| 7,564,405 B2 | 7/2009 | Durst et al. |
| 2002/0070881 A1 | 6/2002 | Marcarelli et al. |
| 2002/0145559 A1 | 10/2002 | Sullivan |
| 2006/0154642 A1 | 7/2006 | Scannell, Jr. |
| 2006/0182076 A1 | 8/2006 | Wang |
| 2007/0030156 A1 | 2/2007 | Schlager et al. |
| 2007/0182625 A1 * | 8/2007 | Kerai et al. ................. 342/357.1 |
| 2007/0247359 A1 | 10/2007 | Ghazarian |
| 2007/0270164 A1 | 11/2007 | Maier et al. |
| 2008/0246656 A1 * | 10/2008 | Ghazarian ................ 342/357.07 |
| 2008/0311882 A1 | 12/2008 | Schlager et al. |
| 2009/0088125 A1 * | 4/2009 | Wollmershauser et al. ........................ 455/404.2 |

* cited by examiner

MANAGING BATTERY POWER FOR MOBILE EMERGENCY COMMUNICATION DEVICE

This application is a continuation-in-part of U.S. patent application Ser. No. 12/322,566 filed Feb. 3, 2009 now U.S. Pat. No. 8,086,250.

BACKGROUND OF THE INVENTION

1. Field of the Invention

The present invention relates to a communications method. More specifically, the present invention relates to a method of efficiently providing communication with and monitoring the location of an individual utilizing a unique blend of various technologies.

2. Description of the Prior Art

A variety of prior art systems have been proposed for the tracking of patients or other objects. Examples of some of such devices and systems are described below.

Hawkins et al., U.S. Pat. No. 4,814,751 sets off an alarm when the signal strength of a transmitted signal falls below a predetermined level. Narcisse, U.S. Pat. No. 4,593,273 provides a similar out of range alarm system. These patents deal with a simple strap on transmitter. In that regard, these devices are more akin to the traditional house arrest system that transmits periodically to a fixed receiver. In this case, instead of an auto dialer, it sounds an audible alarm. The present invention, by contrast, incorporates both a receiver and transmitter that can communicate with multiple base stations. This allows the unit itself to communicate in both directions, and in conjunction with other short range RF communication devices such as Zigbee devices, can be used to track the unit without use of the GPS or transmitter.

Ross et al., U.S. Pat. No. 4,598,275 discloses a movement monitoring system having a wrist band 22 including a receiver 30, a battery and switch 32 and a transmitter 34. The receiver is continuously activated and the transmitter is normally deactivated unless activated by the receiver in response to a signal from a detector. This patent specifically identifies the problems of bulky batteries and of the need to recharge such a device if it is left in transmit mode all of time.

Beetz et al., U.S. Pat. No. 6,544,171 discloses a system for patient monitoring which includes a body sensor for measuring a physiological parameter. This device utilizes a cellular mobile radiotelephone system for tracking purposes. The unit in this patent uses a dedicated sensor device.

Baker, U.S. Pat. No. 6,339,397 discloses a self-contained tracking unit and GPS tracking system. This device utilizes solar power to address power consumption issues.

Werb et al., U.S. Pat. No. 6,700,533 discloses an asset and personnel tagging system utilizing GPS. Werb et al. primarily use a local area LAN, like WiFi, or RFID, to relay GPS data to a server. To use the Werb et al. device, a mobile unit needs to be deployed in the area the tag is to be used and Werb et al. illustrate a truck being used on a construction yard with RFID relaying GPS data to it.

Schwartz et al., U.S. Pat. No. 7,138,916 discloses a computerized system which provides a method to inventory articles, to locate lost or stolen articles and to recover a lost or stolen article. The system applies an electronic tag to each article of a multiplicity of articles or only to a valuable article and employs a computer to maintain an inventory of all articles. Use is made of a global positioning system to locate a lost or stolen article as well as to track movements of the article. A history of the movement of the article may also be plotted on a map. An electronic geographic boundary area may also be placed around an article that can be used to emit a signal indicative of the article leaving the area. This patent is used for asset tracking and its programming was unique, setting it apart from other devices of this type.

Holtzman et al., U.S. Pat. No. 6,400,272 discloses a method of communicating with a RFID tag in which a signal is received from a RFID tag, the tag is identified and a request is sent to the tag for additional data based upon the identified tag type.

Maier et al., United States Patent Application Pub. No. US 2007/0270164A1 dated Nov. 22, 2007 discloses a system and method for an emergency location information service which provides current geographic location for a mobile and non-mobile device (buildings etc.). The method may be used with a communications network 18 of a variety of specified types and allows signals from a first mobile network device to be sent to plural other network devices which includes geographical location information regarding the first device to initiate an emergency communication.

Wang, United States Patent Application Pub. No. US 2006/0182076A1, dated Aug. 17, 2006, discloses a method and system for mesh network embedded devices and relates to a method of managing such networks. The mesh network device wirelessly exchanges information with other mesh network devices on a wireless mesh network or wireless partial mesh network and uses wireless baseband connector of various specified types (such as Bluetooth, IEEE, 802.11 (a)(b) or (g), 802.11.15 and 802.11.5.4—ZigBee).

Scannell, JR., United States Patent Application Pub. No. US 2006/0154642A1, dated Jul. 13, 2006, discloses a medication and health, environmental, and security monitoring, alert, intervention, information and networking system with associated and supporting apparatus. The system can used with a variety of wireless protocols (such as WiFi and Zig-Bee) and utilizes a wireless communication interface in combination with a processor to for activities such as tracking patient progress, creating reminder alerts and monitoring medication dosage.

Various devices and methods have been proposed but all of such known devices and methods still provide less than ideal results. Thus, there remains a need for an improved communications method which solves a number of problems with the prior art.

SUMMARY OF THE INVENTION

The present invention, in its simplest form, provides a method of 2-way data and voice communication with a user utilizing a portable device having a cellular transceiver module, a GPS module and an emergency call button comprising the steps of: a) determining whether said portable device is in proximity of said base station; b) powering down said GPS, placing the portable device into sleep mode and sending a signal to the base station indicating that said portable device is in proximity of the base station (when the portable device is in proximity to the base station); c) activating and fully powering said cellular transceiver module and activating and fully powering said GPS module when said portable device is not in proximity of said base station and further comprising the steps of: i) collecting an initial GPS location data from said GPS module and storing said location data into a memory location; and ii) placing the GPS module into a lower power mode and fully powering said GPS module, acquiring and storing additional GPS location data only at specified intervals to conserve battery life while monitoring said cellular transceiver module for inquiries and monitoring said emergency call button for an emergency signal.

Preferably the method further comprising the steps, when the portable device is not in proximity to the base station, of: iii) initiating an auto dial sequence causing said cellular transceiver module to place a call to an emergency response center when said emergency call button is depressed whereby allowing voice communication between a user of the portable device and the emergency response center to determine the issue and appropriate response; and iv) transferring said GPS location data and said additional GPS location data to said emergency response center and displaying said location data on a web based mapping system.

Preferably, the method further comprises the steps, when the portable device is in proximity to the base station, of transmitting a code to the emergency response center indicating that the portable device is in range and logging said code into a system database.

Preferably, the method further comprises the steps, when the portable device is in proximity to the base station and when said emergency button is depressed, of sending an RF signal from said portable device to said base station to initiate an emergency call to an emergency response center from said base station and also initiating an auto dial sequence causing said cellular transceiver module to place a redundant call to an emergency response center.

Preferably, the method further comprises the steps of: providing a user with a wearable RF pendant and, when the portable device is in proximity to the base station and when an RF pendant emergency button is depressed; sending a RF signal from said RF pendant to said base station; and initiating an auto dial sequence on said base station to make a call to said emergency response center.

Preferably, the method further comprises the steps of: initiating a location request by a remote caregiver via the internet; initiating a database lookup based upon a user ID and password entered by said caregiver; providing the caregiver an "at home" indication if the portable device is in proximity to the base station; providing the caregiver the current GPS location of the user if available, cell tower triangulation data if a current GPS location is not available; and providing the caregiver the last known location from said memory location if a current location is not available.

Preferably, the method further comprises the steps of: initiating a voice request by a remote caregiver via the internet; initiating a database lookup based upon a user ID and password entered by said caregiver; providing the caregiver an "at home" indication if the portable device is in proximity to the base station and providing a conventional voice communications link with the user; and sending a signal to said portable device which causes said portable device to autodial the caregiver's number and auto connects a voice link via a speakerphone provided in said portable device The method of the present invention utilizes a few key components. A Portable Device is provided which is a 2-way data and voice communication device with an emergency call button consisting of a cellular transceiver and GPS module that will be used by the subscriber primarily when they are not in the proximity of their Base Station. When the emergency call button is depressed, the device will automatically call a pre-programmed call center to be connected to an emergency response operator. This call will initiate a 2-way voice phone call between the Portable Device and the emergency response operator. The device will also be capable of sending an emergency RF signal to a Base Station when in the proximity of a Base Station A RF Pendant provides a 1-way RF communication device with an emergency call button capable of sending an emergency RF signal to a Base Station.

A Base Station is provided which provides a 2-way voice and data communication device installed in the subscriber's home which is capable of sending and receiving RF signals from either a Portable Device or an RF Pendant. In addition, the Base Station will be connected to a simple POTS telephone line for communication to a central receiving station. When the Base Station receives an emergency call from either an RF Pendant or a Portable Device, the Base Station will automatically call a pre-programmed number to be connected to an emergency response operator. This call will initiate a 2-way voice phone call between the Base Station and the emergency response operator.

Other objects and features of the present invention will be described in connection with the description of the preferred embodiments of the invention.

DETAILED DESCRIPTION OF THE PREFERRED EMBODIMENTS

Figure 1:
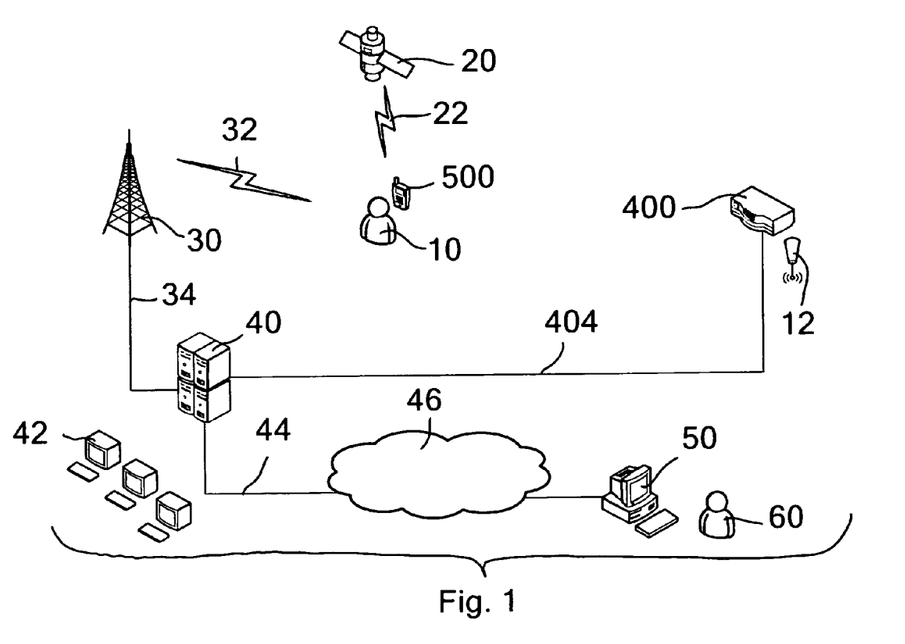
FIG. 1 is a diagrammatic view of the base station and other components of the communications method of the present invention.

Referring to FIG. 1, the basic components utilized with the methods of the present invention are illustrated. These major components include a base station 400, a portable device 500, GPS satellite 20, a cellular tower 30, call center 40, 42, the internet 46, a remote caregiver 60, and the remote caregivers computer 50. In FIG. 1, the base station 400 is aware that the user is outside the home when the cellular device 500 is no longer in communication with the base station. A signal can be sent to the call center 40, 42 to log that the user 10 is no longer at home. The GPS satellite 20 receives a GPS signal 22 from the portable device 500 when the portable device 500 is outside the range of the home base station 400. The portable device 500 logs data and periodically sends data to the call center 40, 42 via a cellular data connection. A GSM GPRS communication link 32 with voice and data provides communication with the cell tower 30. When activated, the portable device 500 will dial a predetermined number and be connected to the call center 40, 42 through line 34. A GPS location will be sent via the data link while the call is taking place. In addition, the portable device 500 will periodically send location data via the cellular data link at predetermined intervals. As can be seen, the call center 40 is connected to the base station 400 by means of a PSTN connection 404. The call center 40 is connected to the internet 46 by line 44 which also provides a link to a computer 50 located at the location of a remote caregiver 60. The call center 40 is manned by terminals or PC's 42 at the center. In FIG. 1, the RFID pendant 12 is shown to be in proximity to the base station 400. Further, in FIG. 1, the remote caregiver 60 can log into the system with PC 50 to determine the location of the user 10. A mapping feature allows the user 10 to be located and to track their movements.

Figure 2:
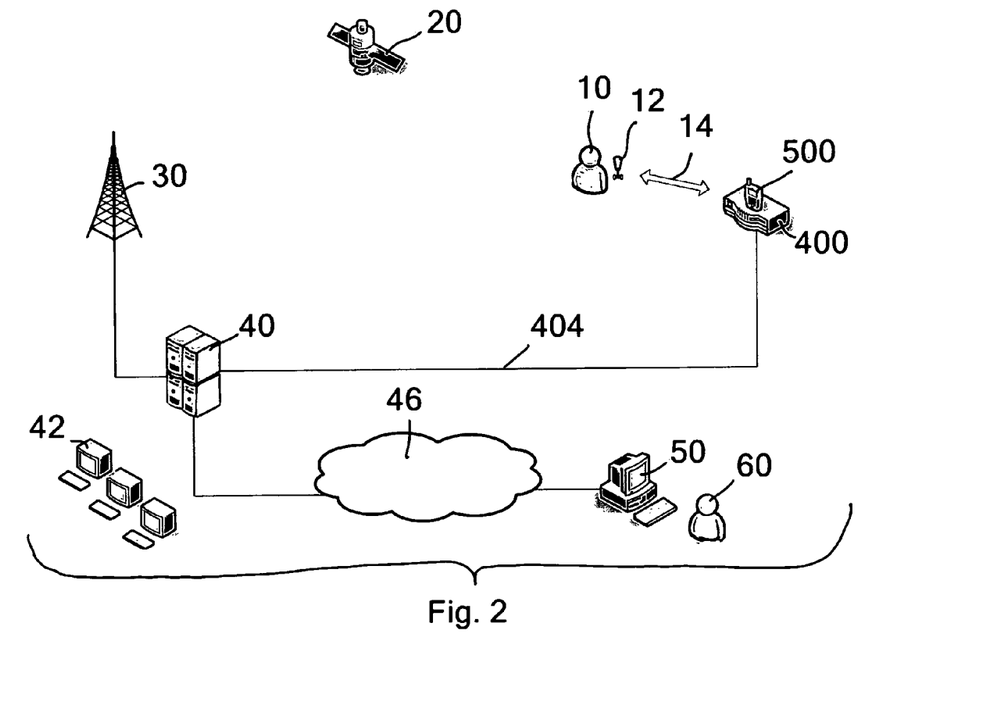
FIG. 2 is a diagrammatic view of the components of the present invention with a user pendant and portable device within proximity to the base station.

FIG. 2 shows the same basic components as FIG. 1 but in FIG. 2 a simple RF connection 14 is established between the base station 400 and the RF pendant 12. In this case, the user 10 switches to the RF pendant 12 and places the cellular device 500 (portable device) in the charging cradle on the base station 400. In this mode of operation GPS data is not required and the GPS module is placed in a standby mode. Further, in this mode, the GSM GPRS communications link in not required and this module is also placed in a standby mode. The base station 400 is aware that the user 10 is inside the home when the portable cellular device 500 is in communication with the base station 400 and/or the portable cellular device 500 is charging in the cradle. A signal can be sent to the call center 40 to log that the user 10 is a home. If the user 10 depresses the panic button on the RF pendant 12 when the pendant is out of range of the base station 400, the RF pendant 12 will transmit a simple RF signal to the base station 400. In this mode the remote caregiver 60 can log into the system to determine if the user 10 is at home or out of range of the base station 400. In this standard mode, location data will not be provided on a routine basis.

Figure 3:
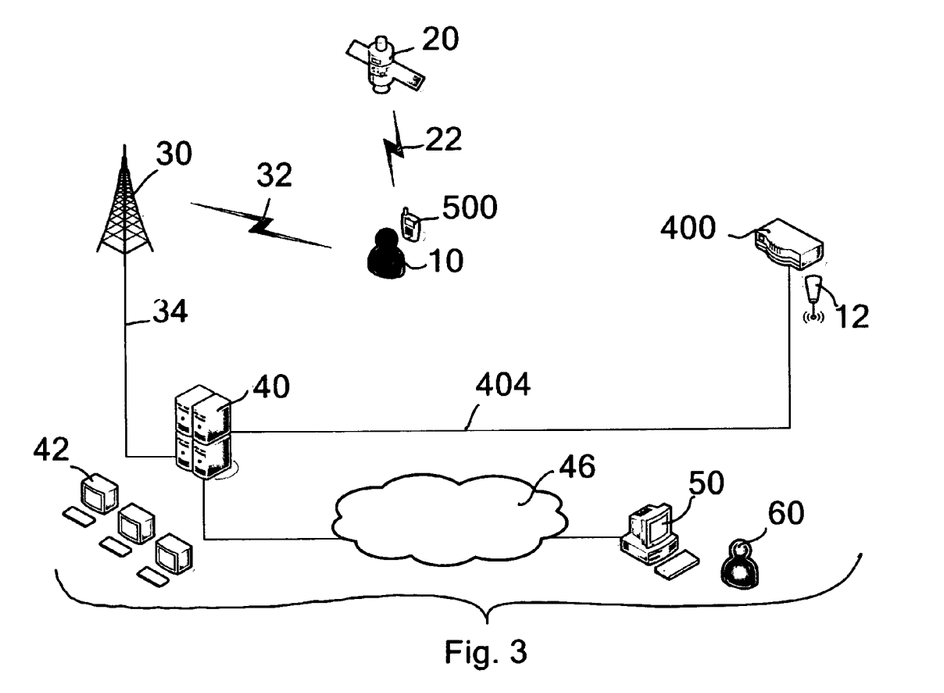
FIG. 3 is a diagrammatic view of the components of the present invention with the portable device not in proximity to the base station.

Referring to FIG. 3 again the same basic components are shown. In this mode the base station 400 is aware that the user 10 is outside the home when the cellular device 500 is no longer in communication with the base station 400. This signaling is accomplished via standard RF protocol from the base station 40 to the portable device 500. The base station 400 is sending a ping on regular intervals to determine if the portable device 500 is in range. A signal can be sent to the call center 40 to log that the user 10 is no longer at home. The GPS signal 22 is received by the portable device 500 when the portable device 500 is outside the range of the home base station 400 from the GPS satellite 20. A GSM GPRS communication link with both voice and data 32 is provided and when activated the portable device 500 will dial a predetermined number and will be connected to the call center 40. Upon connection to the call center 40, the portable device 500 will send a DTMF signal in a 4×2 format to indicate the user 10 ID. The GPS location will be sent via the data link while the call is taking place.

Figure 4:
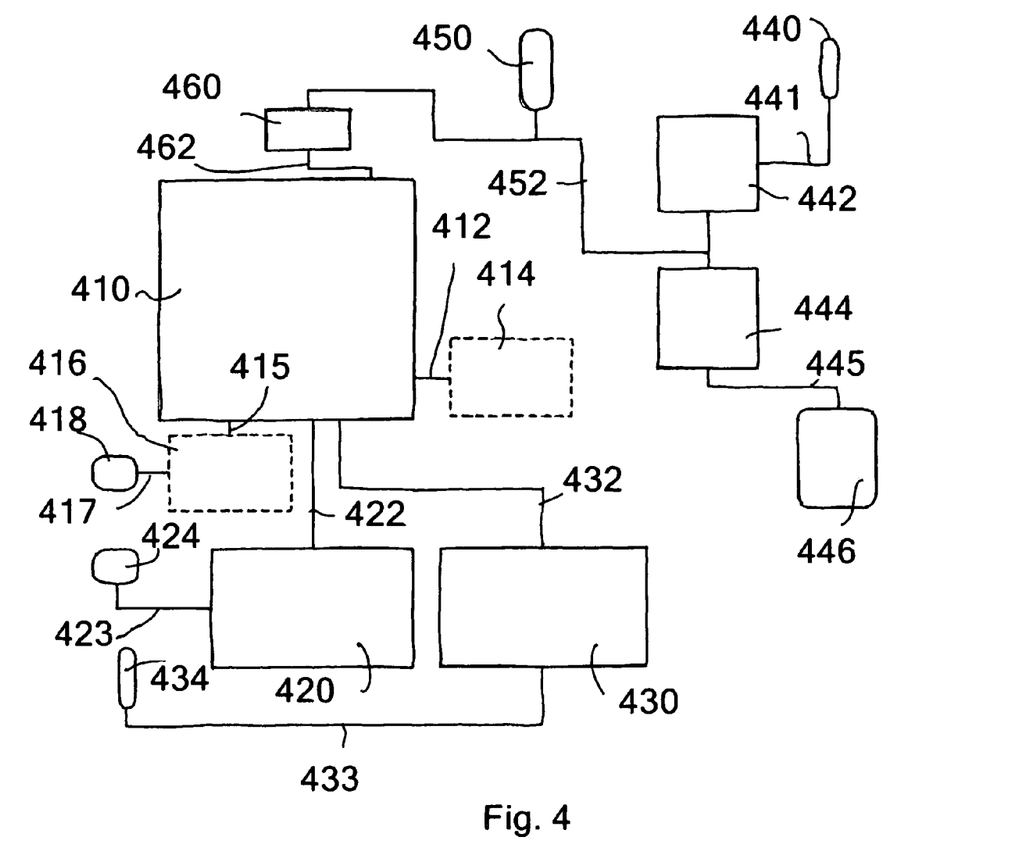
FIG. 4 is a schematic diagram of the base station utilized with the method of the present invention.

Referring to FIG. 4 the base station includes a CPU Module 410 is provided which is connected by line 462 to a RS232/USB Converter 460. This converter 460 is connected via line 452 to a USB/B Connector 450 and to external power. A power regulator 442 is connected by line 441 to an outlet 440. A battery charging circuit 444 is provided and is connected by line 445 to battery 446. Optionally, a 1-10 MB Serial Storage device 414 can be connected to the CPU Module 410 via line 412. Further, an optional Ethernet connection 416 having a RJ-45 port 418 connected by line 417 may be provided. CPU Module 410 is connected by line 422 to a Modem 420. The Modem 420 is connected by line 423 to an RJ-11 port 424. The CPU Module 410 is connected by line 432 to a RFID Mesh Network Receiver 430 which is in turn connected by line 433 to an RFID Antenna 434.

Figure 5:
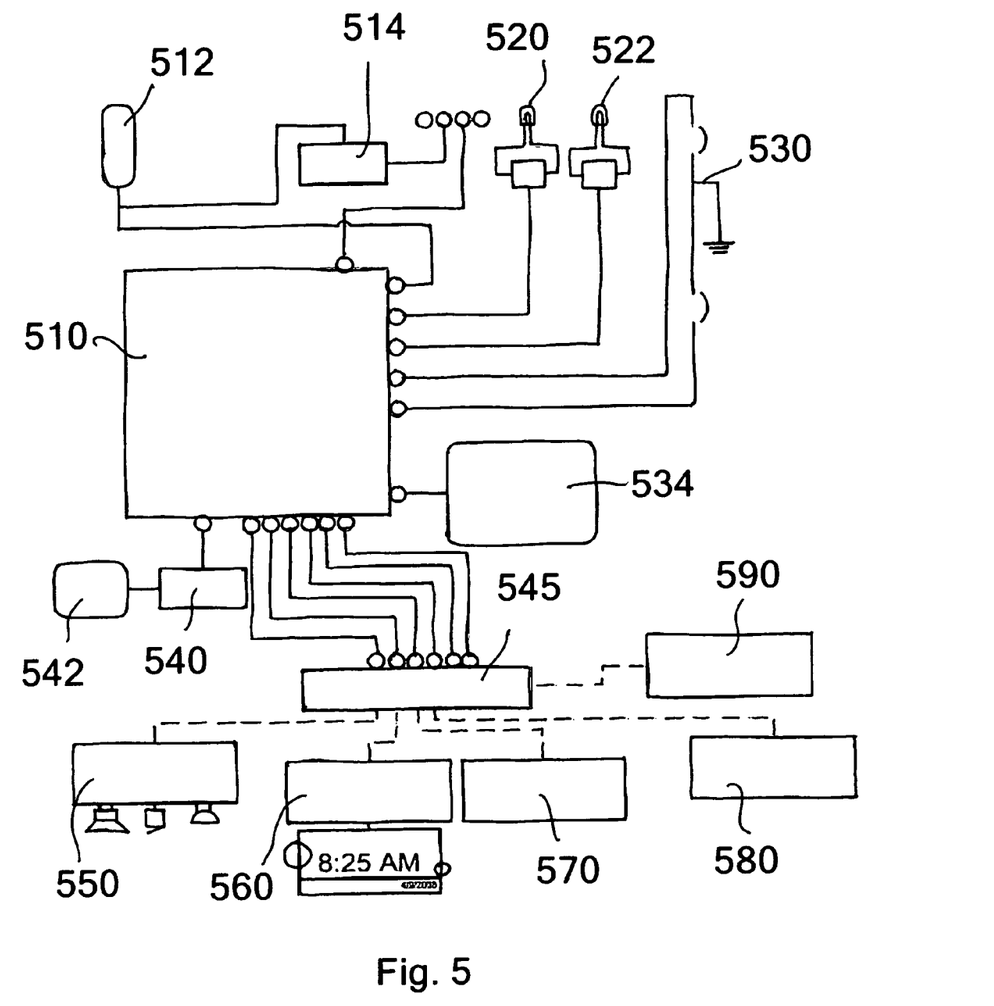
FIG. 5 is a schematic view of the portable device utilized with the method of the present invention.

Referring to FIG. 5, the portable device 500 includes a Cellular Telephone Module 510. A USB connector 512 is connected to a RS232/USB Converter 514. The Cellular Telephone Module 510 is connected to a power source 530 and is also connected to battery 534. A first LED 520 and a second LED 522 are provided. Telit Module 510 is also connected to a GPS Preamp 540 which has a GPS Antenna 542. A plug-in socket 545 may be utilized to connect various components including an Audio Board 550, a Display Board 560, an RFID Board 570, a Bluetooth Module 580 and a simple RF board 590.

Figure 6:
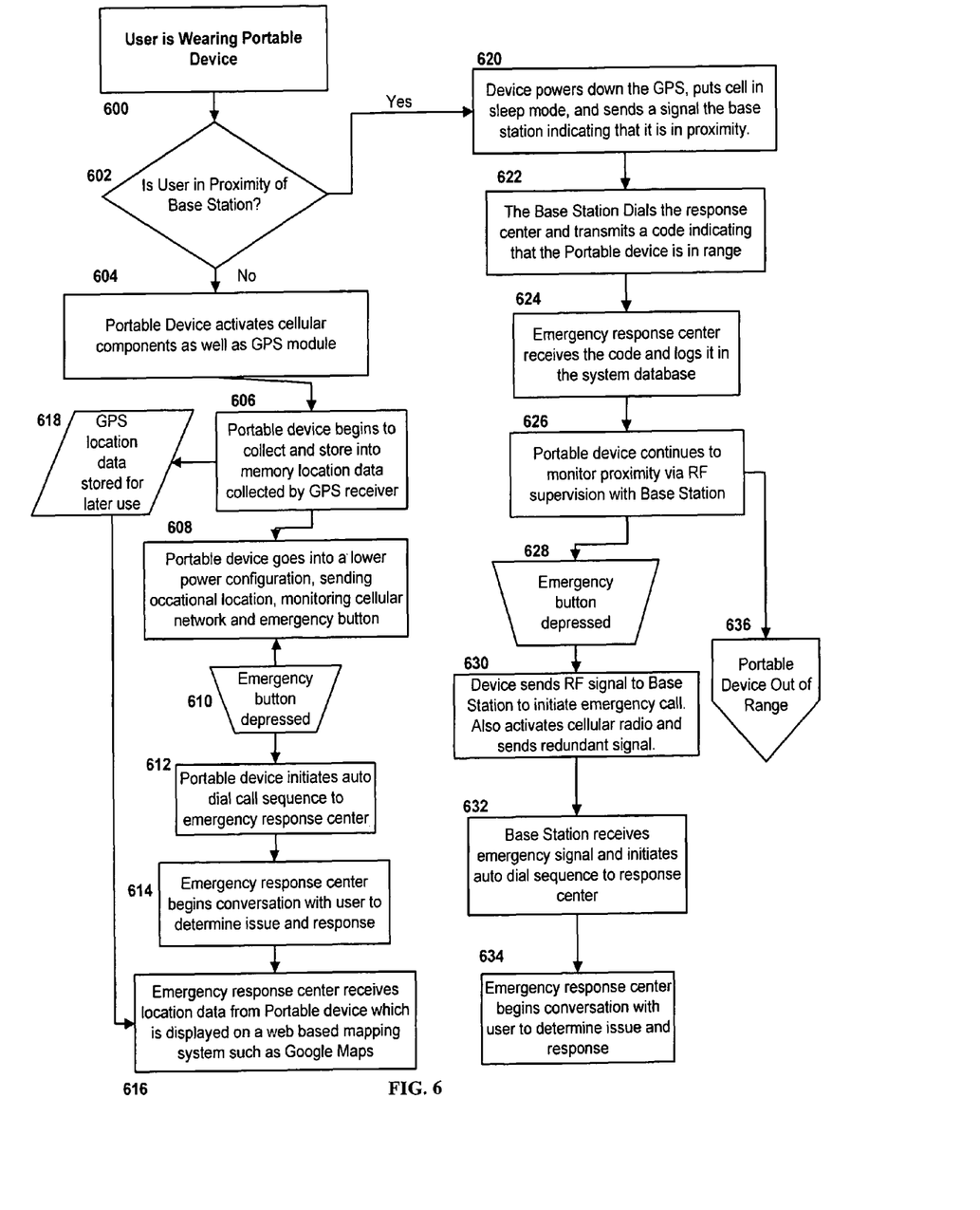
FIG. 6 is a flow chart showing the process steps of a presently preferred embodiment of the present invention.

Referring to the flow chart of FIG. 6 the following steps in the method are shown:

600—User is wearing portable device.
602—Is user in proximity to base station?
604—Portable Device activates cellular components as well as GPS module.
606—Portable Device begins to collect and store into memory location data collected by GPS receiver.
608—Portable Device goes into a lower power configuration, sending occasional location, monitoring cellular network and emergency button.
610—Emergency button depressed.
612—Portable Device initiates auto dial call sequence to emergency response center.
614—Emergency response center begins conversation with user to determine issue and response.
616—Emergency response center receives location data from portable device which is displayed on a web based mapping system such as Google Maps.
618—GPS location data stored for later use.
620—Device powers down the GPS, puts cell in sleep mode, and sends a signal to the base station indicating that it is in proximity.
622—The Base Station Dials the response center and transmits a code indicating that the Portable device is in range.
624—Emergency response center receives the code and logs it in the system database.
626—Portable device continues to monitor proximity via RF supervision with Base Station.
628—Emergency button depressed.
630—Device sends RF signal to Base Station to initiate emergency call. Also activates cellular radio and sends redundant signal.
632—Base Station receives emergency signal and initiates auto dial sequence to response center.
634—Emergency response center begins conversation with user to determine issue and response.
636—Portable Device Out of Range.

Figure 11:
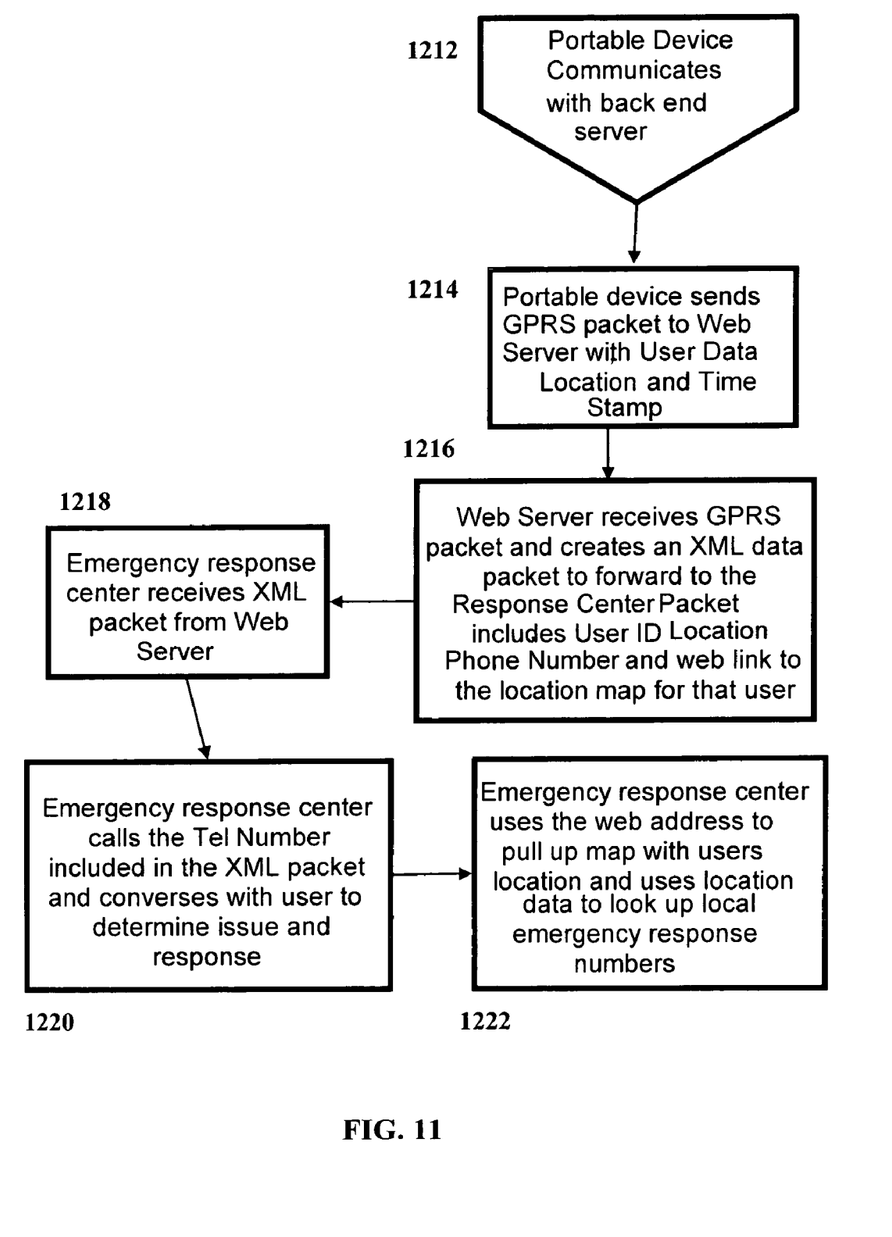
FIG. 11 is a flow chart showing process steps 1212, 1214, 1216, 1218, 1220 and 1222 of an alternative process which replace steps 612, 614 and 616 of the process of FIG. 6 hereof and steps 708, 710 and 712 of the process of FIG. 7 hereof. This refined process is the currently preferred embodiment of the present invention.

A presently preferred method utilizes many of these steps shown in FIG. 6 but which replaces steps 612, 614, 616 and 618 of the process of FIG. 6 herein with the new process steps 1212, 1214, 1216, 1218, 1220 and 1222 as shown in FIG. 11 hereof, Thus the presently preferred embodiment employs the following steps as shown by a combination of a portion of FIG. 6 and all of FIG. 11:

600—User is wearing portable device.
602—Is user in proximity to base station?
If the answer to step 602 is no, the following steps are taken:
604—Portable Device activates cellular components as well as GPS module.

606—Portable Device begins to collect and store into memory location data collected by GPS receiver.
608—Portable Device goes into a lower power configuration, sending occasional location, monitoring cellular network and emergency button.
610—Emergency button depressed.
1212—Portable device communicates with back end server.
1214—Portable device sends a location data packet (this location data packet is currently preferred to be in a GPRS data protocol but other existing or future data protocols may be used) to web server with user data location and time stamp.
1216—Web server receives the location data (GPRS) packet and creates a response center data packet (this response center data packer is currently preferred to have an XML data protocol form but other existing or future data protocols may be used) to forward to the response center, said response center packet includes user ID, location, phone number and web link to the location map for that user.
1218—Emergency response center receives response center (XML) packer from web server.
1220—Emergency response center calls the telephone number included in the response center (XML) packet and converses with the user to determine issue and response.
1222—Emergency response center uses the web address to pull up a map with the user's location data to look up local emergency response numbers.

If the answer to step 602 is yes, the following steps are taken:
620—Device powers down the GPS, puts cell in sleep mode, and sends a signal to the base station indicating that it is in proximity.
622—The Base Station Dials the response center and transmits a code indicating that the Portable device is in range.
624—Emergency response center receives the code and logs it in the system database.
626—Portable device continues to monitor proximity via RF supervision with Base Station.
628—Emergency button depressed.
630—Device sends RF signal to Base Station to initiate emergency call. Also activates cellular radio and sends redundant signal.
632—Base Station receives emergency signal and initiates auto dial sequence to response center.
634—Emergency response center begins conversation with user to determine issue and response.
636—Portable Device Out of Range.

Figure 7:
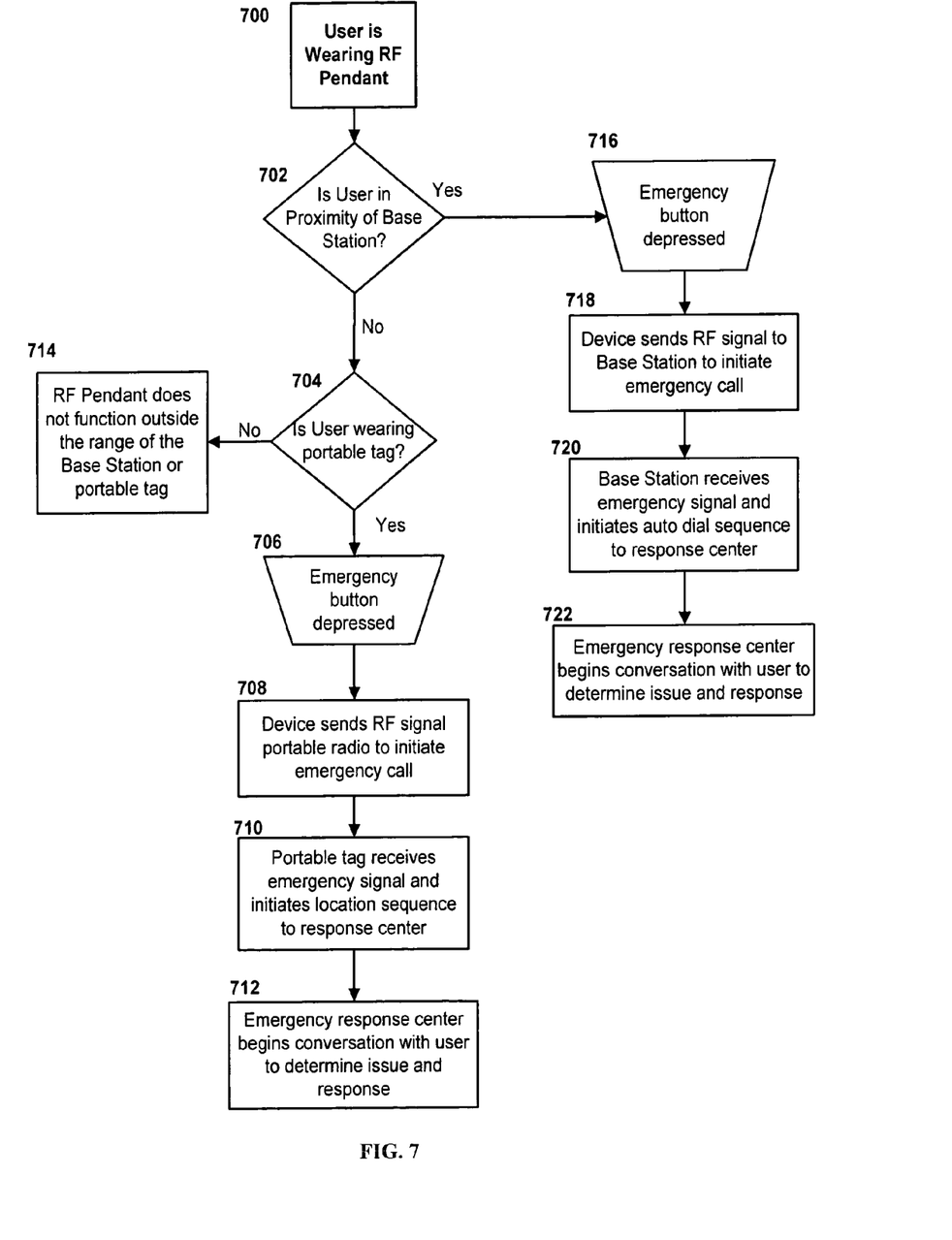
FIG. 7 is a flow chart showing the process steps of alternative embodiments of the method of the present invention.

Referring to the flow chart of FIG. 7 the following steps in the method are shown:
700—User is Wearing RF Pendant.
702—Is User in Proximity of Base Station?
704—Is User wearing portable tag?
706—Emergency button depressed.
708—Device sends RF signal to portable radio to initiate emergency call.
710—Portable tag receives emergency signal and initiates location sequence to response center.
712—Emergency response center begins conversation with user to determine issue and response.
714—RF Pendant does not function outside the range of the Base Station or portable tag.
716—Emergency button depressed.
718—Device sends RF signal to Base Station to initiate emergency call.
720—Base Station receives emergency signal and initiates auto dial sequence to response center.
722—Emergency response center begins conversation with user to determine issue and response.

A presently preferred method utilizes many of these steps shown in FIG. 7 but which replaces steps 708, 710 and 712 of the process of FIG. 7 herein with the new process steps 1212, 1214, 1216, 1218, 1220 and 1222 as shown in FIG. 11 hereof, Thus the presently preferred embodiment employs the following steps as shown by a combination of a portion of FIG. 7 and all of FIG. 11:
700—User is Wearing RF Pendant.
702—Is User in Proximity of Base Station?
704—Is User wearing portable tag?
706—Emergency button depressed.
1212—Portable device communicates with back end server.
1214—Portable device sends a location data packet (the location data packet is currently preferred to have a GPRS data protocol but any existing or future data protocol may be used) to web server with user data location and time stamp.
1216—Web server receives location data (GPRS) packet and creates a response center data packet (the response center data packet is currently preferred to have an XML data protocol but any existing or future data protocol may be used) to forward to the response center, said packet includes user ID, location, phone number and web link to the location map for that user.
1218—Emergency response center receives response center data (XML) packet from web server.
1220—Emergency response center calls the telephone number included in the response center data (XML) packet and converses with the user to determine issue and response.
1222—Emergency response center uses the web address to pull up a map with the user's location data to look up local emergency response numbers.
714—RF Pendant does not function outside the range of the Base Station or portable tag.
716—Emergency button depressed.
718—Device sends RF signal to Base Station to initiate emergency call.
720—Base Station receives emergency signal and initiates auto dial sequence to response center.
722—Emergency response center begins conversation with user to determine issue and response.

Figure 8:
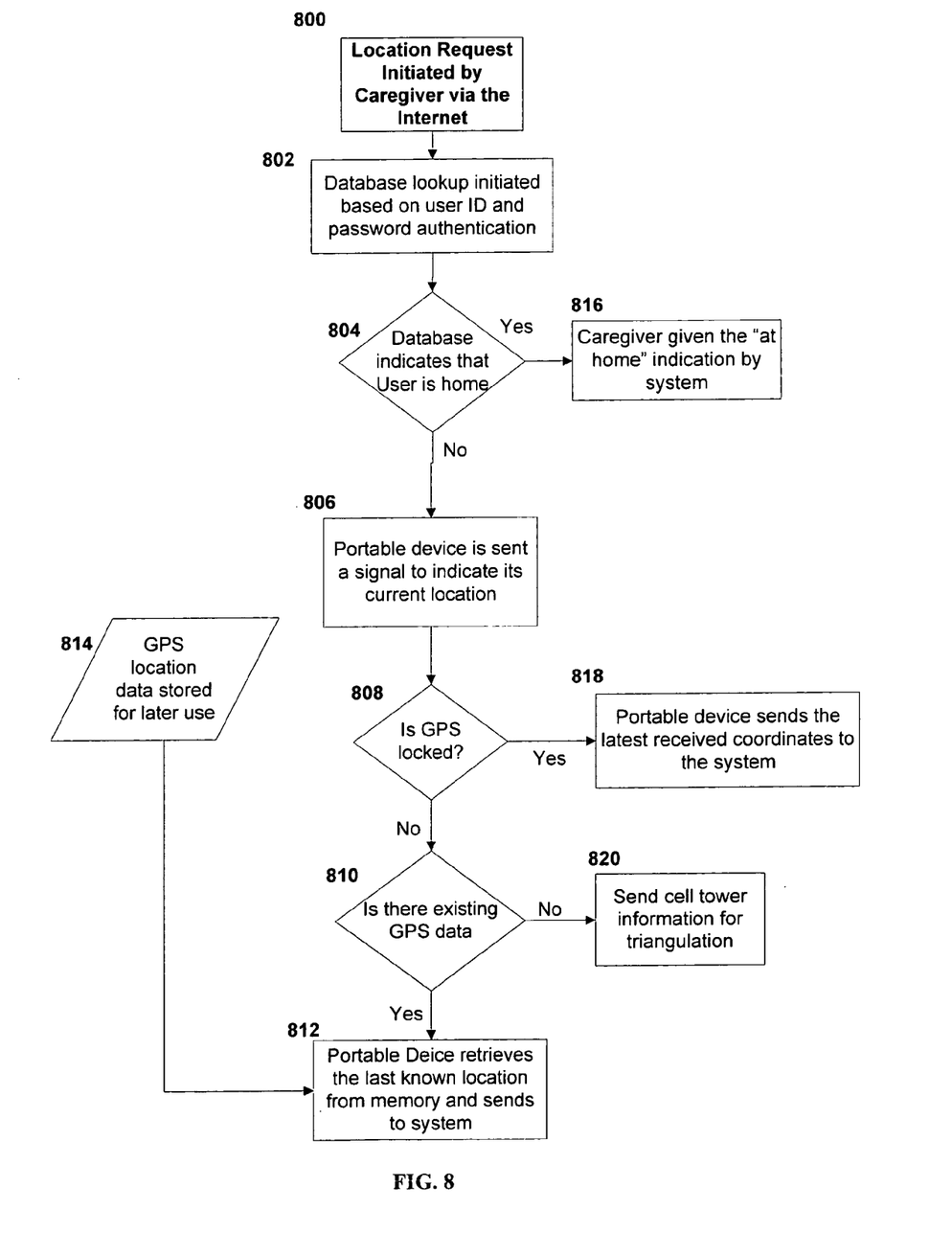
FIG. 8 is a flow chart showing the process steps of still further embodiments of the method of the present invention.

Referring to the flow chart of FIG. 8 the following steps in the method are shown:
800—Location Request Initiated by Caregiver via the Internet.
802—Database lookup initiated based on user ID and password authentication.
804—Database indicates that User is home.
806—Portable device is sent a signal to indicate its current location.
808—Is GPS locked?
810—Is there existing GPS data?
812—Portable Device receives last known location from memory and sends to system.
814—GPS location data stored for later use.
816—Caregiver given the "at home" indication by system.
818—Portable device sends the latest received coordinates to the system.
820—Send cell tower information for triangulation.

Figure 9:
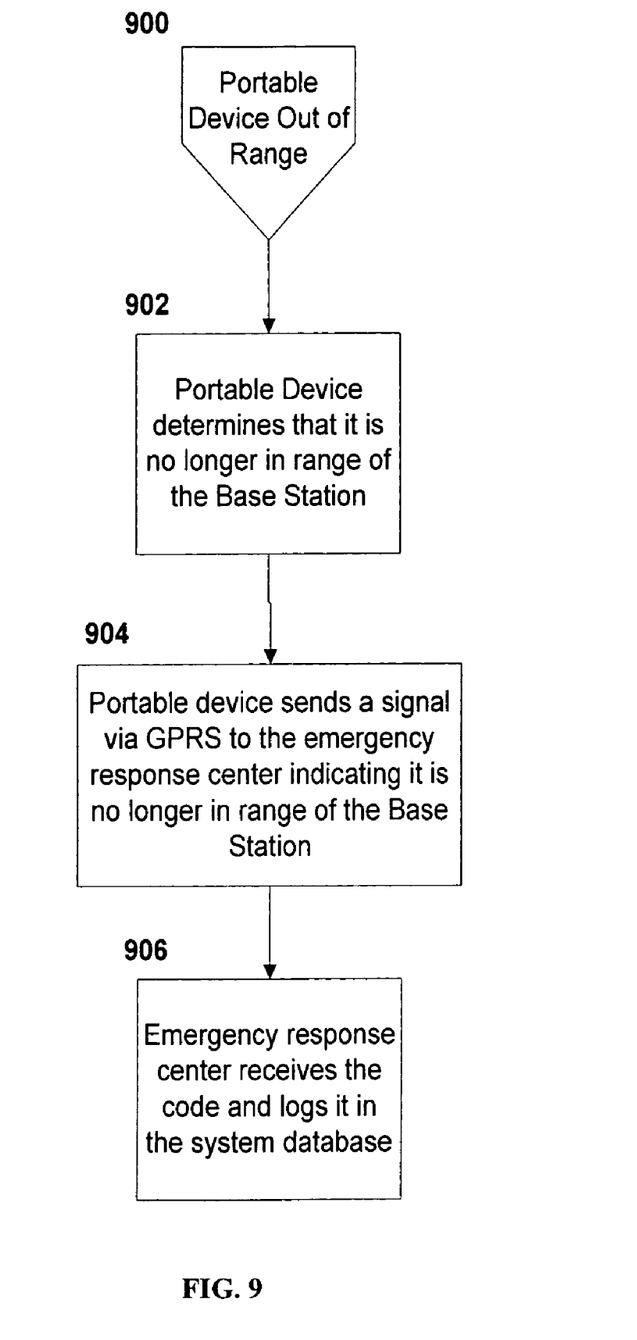
FIG. 9 is a flow chart showing the process steps of a still further embodiment of the method of the present invention.

Referring to the flow chart of FIG. 9 the following steps in the method are shown:

900—Portable Device Out of Range

902—Portable Device determines that it is no longer in range of the Base Station.

904—Portable device sends a signal via a cellular data protocol to the emergency response center indicating it is no longer in range of the Base Station.

906—Emergency response center receives the code and logs it in the system database.

Figure 10:
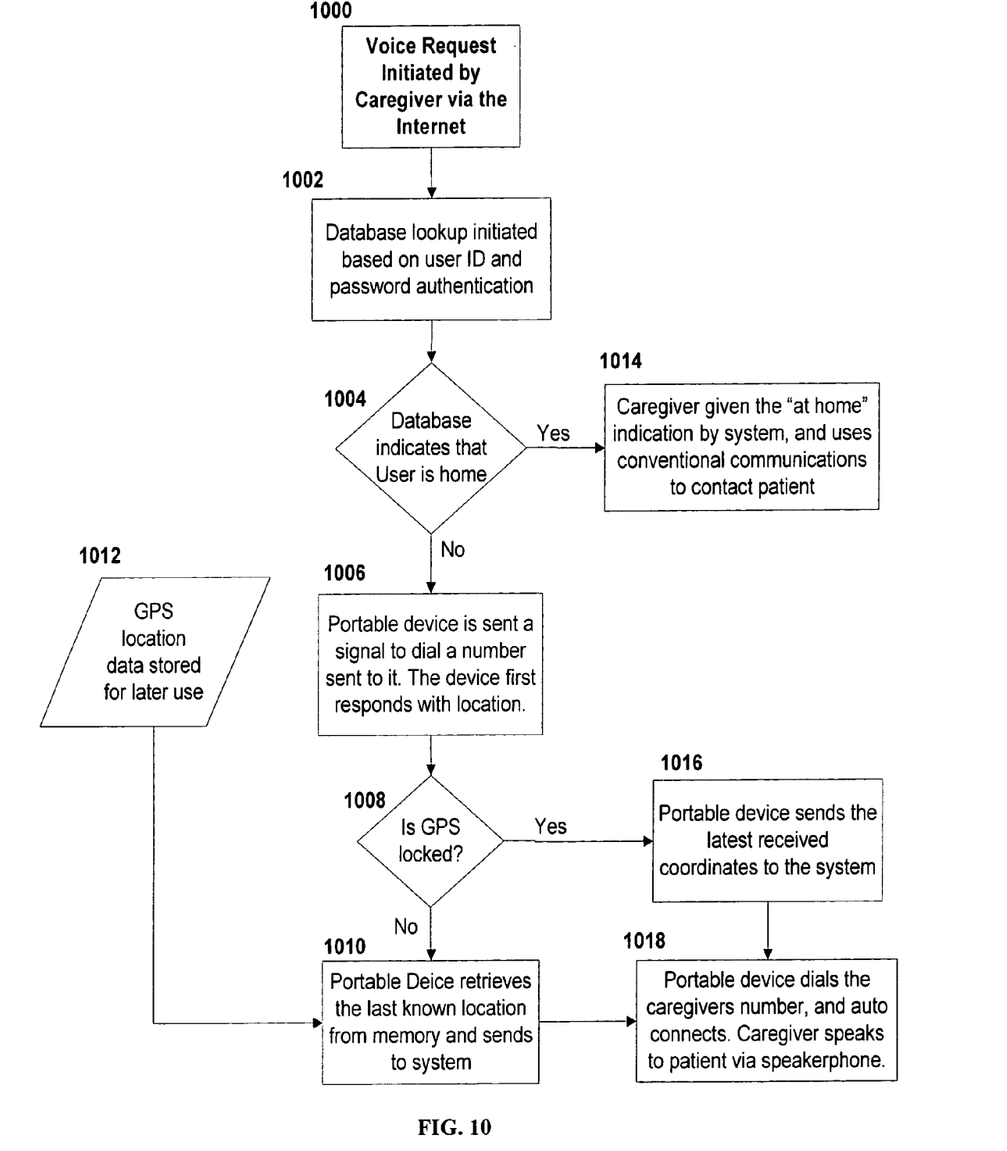
FIG. 10 is a flow chart showing the process steps of yet another embodiment of the method of the present invention.

Referring to the flow chart of FIG. 10 the following steps in the method are shown:

1000—Voice Request Initiated by Caregiver via the Internet.

1002—Database lookup initiated based on User ID and password authentication.

1004—Database indicates that User is home

1006—Portable Device is sent a signal to dial a number sent to it.

The device first responds with location.

1008—Is GPS locked?

1010—Portable Device retrieves the last know location from memory and sends to system.

1012—GPS location data stored for later use.

1014—Caregiver given the "at home" indication by system, and uses conventional communications to contact patient.

1016—Portable device sends the latest received coordinates to the system.

1018—Portable device dials the caregiver number, and auto connects, Caregiver speaks to patient via speakerphone.

The method of the present invention is designed to have a use model which includes the following features and functions. The Portable device will primarily be used when the subscriber leaves the home and is no longer in range of the Base Station. When the subscriber is at home, the Portable Device will be in proximity to the Base Station and will be reduced to low power mode in which the cellular components are turned to hibernate and the GPS receiver is turned off Ideally, the Portable Device will be placed in a charging base which is integrated into the Base Station. The Portable Device will also have an RF communicator so that the device can send an alert to the Base Station if depressed. When the Portable Device is in the charging cradle, the device is placed into low power mode. The charging cradle will be built into the Base Station. The Base Station can be capable of sending a signal via auto-dialer to indicate that the Portable Device is at home.

When the Portable Device is at home (as a preferred optional service), once you leave the proximity of the Base Station, the cellular device is turned on and the GPS is instructed to get a fix. Once the initial location is acquired, the GPS will be placed into a low power mode which acquires a fix at specified intervals which will be set to optimize battery life. The device will be in listening mode to detect instructions from potential inquiries. If the user has an emergency, the button is depressed and the device automatically dials a predetermined number to the call center. The call is received by the monitoring station and a DTMF code (6 digits in a 4 by 2 format) is sent to identify the user and held until an operator answers. A two-way voice communication is used to determine the issue. As the call is initiated, the location data and user data is being sent via a cellular data protocol such as GPRS to the back end system.

The RF Pendant utilized with the present method is used as follows. When the user is in the home, the RF Pendant is used as the communicator to the Base Station. If depressed the RF module will send a simple data stream to the Base Station indicating an alarm is being initiated. This will utilize the current product capabilities used in the medical alerting industry.

In terms of the general system information, a backend system will be built around standard call center technology. The SW will be licensed from a current manufacturer of call center software. Location data will need to be added along with a presentation layer.

Preferably, the method of the present invention will provide the following optional features which will be preferably built into the initial design but provided to a user for an extra subscription charge.

Once you leave the proximity of the Base Station, the Portable Device sends a signal to indicate the initial location of the user. This signal is sent via a cellular data protocol such as GPRS data, and is a programmable option which could be initiated during the online setup.

Medication reminders which can be set online. The calendar will be sent to the Base Station and to the Portable Device to alarm the user that medications are required. If the Portable Device is in the charging cradle it will not alarm. In both cases, the alarm will need to be reset.

Caregiver pings the device to get its location, and the device sends the last good location to the server.

Caregiver requests a set of data for all of the last location data received. (breadcrumbs)

Ability to call the user through the device via the monitoring station. When the device is called it will auto pick up. (i.e. a caregiver could call the service and initiate a call through the device)

Ability to charge the device without any exposed pins via magnetic induction. Roadmap Features Motion detection for prolonged periods of non-movement.

Bluetooth capability to communicate between the Portable Device and other devices such as vital signs monitoring devices.

Ability to work in a WiMAX network.

LCD display for the Portable Device that could be used for the medicine alert feature.

Some of the key objects and features of the methods of the present inventions include the following:

When the portable device is in proximity to the base station, it is reduced to low power mode which will prolong the battery life if it is not placed in the charging cradle.

The base station can be capable of sending a signal via auto-dialer to indicate that the portable device is at home. Since we are adding location data which is not available on existing systems, this is a new capability (i.e. home becomes a defined known location)

Once you leave the proximity of the base station, the cellular device is turned on and the GPS is instructed to get a fix. Once the initial location is acquired, the GPS will be placed into a low power mode which acquires a fix at specified intervals which will be set to optimize battery life.

When a call is initiated by the user, the location data and user data is being sent via GPRS to the back end system without interrupting the call.

Portable device as the base station. The portable device in our model could replace the current base station entirely by utilizing the cellular connection as the primary connection mechanism to the call center.

Portable device interoperability with existing medical alarm systems. In order to accomplish this, we simply need to add the simple RF communication board to the portable device. This will allow our portable device to interoperate with existing systems but add the cellular/GPS capability to their systems.

Circuitry can be added to the portable device charging cradle that will allow an existing system (i.e. competitor system) to gain the "at home" location verification when the portable device is in the charging cradle. The charging cradle could then be programmed to send a message through the standard auto dialer system to indicate that the user has returned home.

A core device will provide all of the core functionality required for a suite of products. A series of plug in modules can provide the ability to convert the base unit into a medical tracking and monitoring tag, a pendant emergency alert system, a pet tracker and a dashboard vehicle tracker.

The core device would preferably include the following components:

1. A motherboard capable of mounting a GPS/GPRS radio, the USB/B connector, a 750 mah to 1000 mah lithium battery, the SIM card required by the GSM/GPRS network, and an area where a "personality" board can be mounted to change its overall function.
2. An RF modem with onboard processor. The current design uses the Telit 6800 device. Other radios can also be used, but must be able to meet stringent power and size requirements.
3. GPS receiver, preamp and antenna. The GPS needs to be useful indoors, provide both full and assisted GPS capability, and provide a low standby power draw. In the current design, the GPS is integral to the Telit device.
4. A SIM socket, with slide or locking mechanism to keep the SIM in place.
5. A plug in for an external communications device. This would plug into the motherboard, allowing multiple options. Some of these would be:
  a. Display Board. Using a standard display chip and display panel from a cell phone, a display that can be used to simulate a clock, or display other information.
  b. Zigbee RFID module. This "mesh" network device will communicate with the base station, and provide a low power communications link between the base station and the device.
  c. A Bluetooth module. This device would allow communications with remote devices set up with Bluetooth capability.
  d. A simple receiver. Like an automobile remote control, this device can pick up switch closure from a small device.

The base station would preferably include the following components:

6. A motherboard, with onboard power supply, and optional battery backup. The base station will normally operate using wall power, and the battery backup will allow it to continue functioning during a power failure of short duration.
7. A charging supply, capable of recharging any one of the aforementioned products. The output will be 5-6 volts, and provided through a USB/B style connector. The USB/B connector will also provide a data port, so when a device is plugged in, it can transfer stored data to the base station processor, and be used to upload new programming to the device.
8. A processor board. This would plug into the motherboard, and would contain the logic for monitoring the remote devices, and autodial a phone line to connect to a remote server.
9. A plug in for an external communications device. This would plug into the motherboard, allowing the base station to communicate to the outside world. Different devices can be used for this purpose.
  a. A modem. This device would be able to autodial on a POT's line ("Plain Old Telephone") and establish a connection to a server on the other end. This device would be able to communicate using DTMF ("touch tone") and PPP ("Point to Point Protocol").
  b. Ethernet. For homes and institutions that have Internet connectivity, this would provide a direct instant connection to the outside world.
  c. Telit GSM/GPRS device. When plugged in, this device would communicate directly with cell phone providers and would eliminate the need for a dedicated phone line.
10. A plug in for the internal communications device. This device will communicate with the remote device(s), allowing them to operate in a low power mode, and communicate directly with them, bypassing the use of GSM/GPRS when in proximity to the base station. The plug in would be one of the following:
  a. Zigbee RFID module. This "mesh" network device will communicate with the remote devices, and provide a low power communications link between the base station and the remote device(s).
  b. A Bluetooth module. This device would allow communications with remote devices set up with Bluetooth capability.
  c. A simple receiver. Like an automobile remote control, this device can pick up switch closure from a small device.

The size, power consumption and construction of the components utilized with the present methods are huge constraints that need to be addressed in the radio tag design. The design of the device should take into consideration the following constraints:

The tag must remain small, and yet have enough battery power to keep it operational when at full power for several hours, and at low power for a minimum of 2 weeks.

The current dimensions are 1½×2×½ inches, including battery. This does not include the antenna, which is to be mounted in the casing.

The tag has a USB/B style port, which can be used to charge the battery, and do factory and field programming. The base tag should also include a USB to serial converter, powered by the USB line.

The tag requires 2 push buttons, and 2 LED slots. Even if not populated in every design, these provide a tactile means of activating and interacting with the tag. This is very useful for prototype debugging.

The tag requires a SIM holder. This can be the slide or clip style of holder, but in the current design, it is located under the battery, so a top clip works best.

The tag requires 4 connectors to the battery. The battery is a lithium rechargeable type of 3.6V, and a total amp/hour rating between 750 MAH to 1 AH that will fit in the physical constraints described earlier.

A connector is required under the battery. This connector will bring out the audio, microphone, and other 10 connections from the microprocessor/radio, and present them so that a small paddle board may be connected. The connector would also allow for the "remoting" of components, by allowing a cable to be extended to a second board located further away.

A GPS preamp, to work in conjunction with the onboard GPS. This will allow a small "onboard" antenna, such as a ceramic patch, to be attached directly to the radio (over the shield which would serve as a ground plain. In most cases, this would not be populated, and the GPS/preamp would be located remotely.

The tag will require a series of "test" connections. Power and ground should be monitored or provided from the edge of the board. For the primary input and the GPS output, pin outs are to be provided.

A series of "personality" modules will be capable of plugging into the main tag and adding extended features. Each of these boards will be described in its own specification.

Due to the requirement for portability, there are power and voltage constraints as well which include the following:

All components will operate in the 2.8 to 4.2 volt range, with 2.8 volts being the lowest voltage, and 4.2 being the highest voltage that potentially may be expected from a standard 3.6 lithium battery.

All IO devices (buzzer, LED, LCD displays, etc.) must be able to operate with 2.8 volt logic.

The radio must be able to be placed in a low power mode by a single input pin, available on the personality board socket. The radio must completely power off and consume at power off less that 100 UA.

Charging voltages must be between 5 to 5.6 volts, to remain compliant with the USB standard. The unit can not draw power greater than 100 ma from a computer until the remote system can register the device.

The base station will be used as the central hub for the suite of products. This would include the Alzheimer's tracking wrist band, the pet tracking collar, and the emergency alert pendant.

In terms of layout, the physical size and the powering of the base station are not constraints in the design. The base station will need to accommodate the largest remote device produced to serve as its changing station. It will also need to be large enough to house the plug-in components. These modules are small in size, and so also do not constrain the design.

It is envisioned that the first devices utilized with the present methods would use existing modules. As a CPU module, a Rabbit Core Modules, RCM3700, can be used for this feature. The Rabbit modules come with a built in Ethernet connection, and libraries that already can use the Xbee module, MultiTech Modem, Ethernet, BlueTooth and other communication protocols. The RCM4000 comes with expanded memory, which can be used for data logging. For the modem, the MultiTech MT5600SMI-L-34.R2-SP is a plug in device that will allow dial-up on a POT's line. For RFID, the MaxStream Xbee module can be used to communicate with the remote devices. A standard plug-in pack power supply will connect to a wall outlet. An onboard power supply will convert this power into what is needed to power the base station, and charge the plug-in devices. 1.2V Ni-Cad cells can be used to provide short term power in the event of a power failure.

The backend system will be built around standard call center technology. The software (SW) will be licensed from a current manufacturer of call center software. The backend will also preferably have the ability to work in a WiMAX network.

It is to be understood that while certain forms of the present invention have been illustrated and described herein, the present invention is not to be limited to the specific forms or arrangements of parts described and shown.

We claim:

1. The method of 2-way data and voice communication with a user utilizing a base station and portable device, said portable device having a cellular transceiver module, a GPS module and an emergency call button comprising the steps of: activating and fully powering said cellular transceiver module of said portable device and activating and fully powering said GPS module of said portable device when said portable device is not in proximity of said base station and further comprising the steps of:
   i) collecting initial GPS location data from said GPS module of said portable device and storing said location data into a memory location;
   ii) after collecting said initial GPS location data then placing the GPS module of said portable device into a lower power mode, while in said lower power mode monitoring said cellular transceiver module for inquiries and monitoring said emergency call button for an emergency signal, thereafter only fully powering said GPS module to acquire and store additional GPS location data at specified intervals to conserve battery life; and
   iii) communicating with web server when said emergency call button is depressed;
   iv. creating a response center data packet on said web server when said web server receives said response center data packet; and
   v. forwarding said response center data packet to an emergency response center, said response center data packet including user ID, location, phone number and web link to a location map for said user.

2. A method of 2-way data and voice communication according to claim 1 further comprising the steps of:
   vi. once said response center data packet is received by the emergency response center, calling the telephone number in said response center data packet to talk to the user to determine the issue and appropriate response.

3. The method of 2-way data and voice communication according to claim 2 further comprising the steps of:
   vii. at the emergency response center, using the web address to pull up a map which has user's location thereon and using said location data to look up local emergency numbers.

* * * * *